(12) United States Patent
Carlier

(10) Patent No.: US 11,492,060 B2
(45) Date of Patent: Nov. 8, 2022

(54) CHAIN CASING AND CHAIN TENSIONING ASSEMBLY

(71) Applicant: VanMoof B.V., Amsterdam (NL)

(72) Inventor: Ties Jonan Midas Carlier, Amsterdam (NL)

(73) Assignee: VANMOOF B.V., Amsterdam (NL)

( * ) Notice: Subject to any disclaimer, the term of this patent is extended or adjusted under 35 U.S.C. 154(b) by 209 days.

(21) Appl. No.: 16/606,886

(22) PCT Filed: Apr. 23, 2018

(86) PCT No.: PCT/NL2018/050258
§ 371 (c)(1),
(2) Date: Oct. 21, 2019

(87) PCT Pub. No.: WO2018/194459
PCT Pub. Date: Oct. 25, 2018

(65) Prior Publication Data
US 2020/0047837 A1    Feb. 13, 2020

(30) Foreign Application Priority Data

Apr. 21, 2017    (NL) ...................................... 2018764

(51) Int. Cl.
*B62J 13/04*    (2006.01)
*B62M 9/16*    (2006.01)
(Continued)

(52) U.S. Cl.
CPC ................ *B62J 13/04* (2013.01); *B62M 9/16* (2013.01); *F16H 7/1281* (2013.01); *F16H 7/18* (2013.01);
(Continued)

(58) Field of Classification Search
CPC ............. B62J 13/04; B62J 13/06; B62M 9/16
(Continued)

(56) References Cited

U.S. PATENT DOCUMENTS 611,750 A * 10/1898 Fulford .................... B62J 13/04
474/147
659,235 A * 10/1900 Jeffery ..................... B62J 13/04
474/147
(Continued)

FOREIGN PATENT DOCUMENTS

CN    202320708 U    7/2012
CN    202642017 U    1/2013
(Continued)

*Primary Examiner* — Henry Y Liu
(74) *Attorney, Agent, or Firm* — The Webb Law Firm

(57) ABSTRACT

The present invention relates to a chain casing for encasing of a chain spanning a main chain sprocket and a driven chain sprocket, such as having two free chain parts, a pulling chain part and a returning chain part, of preferably a vehicle, such as a bicycle having a frame, the chain casing having: —a main chain sprocket cover element for covering of the chain at the main chain sprocket, such as a pedal spindle chain sprocket; —a pulling chain part cover element for covering of at least a part of a pulling chain part between a main chain sprocket and the driven chain sprocket; —a returning chain part cover element for covering of at least a returning chain part between the main chain sprocket and the driven chain sprocket; —a chain tensioner cover element for covering of a chain tensioner assembly with the chain arranged therethrough. Furthermore, the present invention relates to a chain tensioner assembly, preferably fitting in the chain casing.

22 Claims, 15 Drawing Sheets

(51) Int. Cl.
*F16H 7/12* (2006.01)
*F16H 7/18* (2006.01)
*F16H 7/08* (2006.01)

(52) U.S. Cl.
CPC .. *F16H 2007/081* (2013.01); *F16H 2007/087* (2013.01); *F16H 2007/0842* (2013.01); *F16H 2007/0893* (2013.01)

(58) Field of Classification Search
USPC ................................ 474/144, 134, 135, 112
See application file for complete search history.

(56) References Cited

U.S. PATENT DOCUMENTS

| | | | | |
|---|---|---|---|---|
| 3,121,575 A * | 2/1964 | Bourgi | ................... | B62M 9/16 280/236 |
| 3,398,973 A * | 8/1968 | Shimano | ................. | B62M 9/16 280/236 |
| 3,402,942 A * | 9/1968 | Shimano | ................. | B62M 9/16 280/236 |
| 3,785,219 A * | 1/1974 | Anthamatten | ........... | B62M 9/16 474/81 |
| 4,099,737 A * | 7/1978 | Waugh | .................... | B62M 9/06 280/261 |
| 5,213,549 A * | 5/1993 | Blanchard | ................ | B62M 9/12 474/81 |
| 5,725,450 A * | 3/1998 | Huskey | .................... | B62M 9/06 474/116 |
| 6,135,903 A * | 10/2000 | Savard | ..................... | B62M 9/16 474/80 |
| 7,059,983 B2 * | 6/2006 | Heim | ..................... | B62M 9/138 474/78 |
| 8,033,945 B2 | 10/2011 | Patterson | | |
| 8,371,974 B2 * | 2/2013 | Morita | ..................... | B62M 9/16 474/136 |
| 9,400,037 B2 * | 7/2016 | Hara | ......................... | F16H 7/12 |
| 2003/0224891 A1 * | 12/2003 | Chou | ....................... | B62M 9/16 474/146 |
| 2005/0176538 A1 * | 8/2005 | Morita | ..................... | B62M 9/16 474/136 |
| 2009/0088284 A1 * | 4/2009 | Patterson | ................. | B62J 13/04 475/213 |
| 2010/0194182 A1 * | 8/2010 | Katz | ...................... | B62K 25/30 301/109 |
| 2010/0234154 A1 * | 9/2010 | Klieber | ................... | B62M 9/16 474/80 |

FOREIGN PATENT DOCUMENTS

| | | |
|---|---|---|
| FR | 457646 | 9/1913 |
| JP | S5823792 U | 2/1983 |
| JP | 2010540321 A | 12/2010 |

* cited by examiner

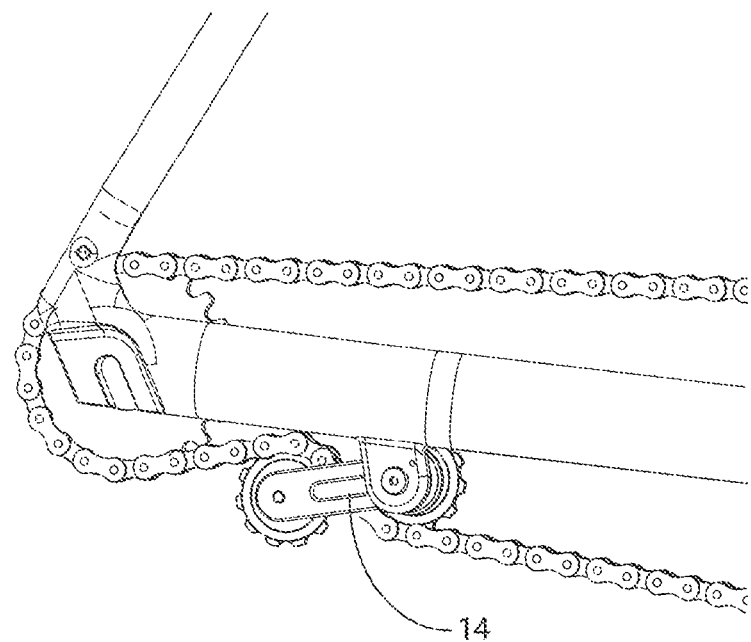
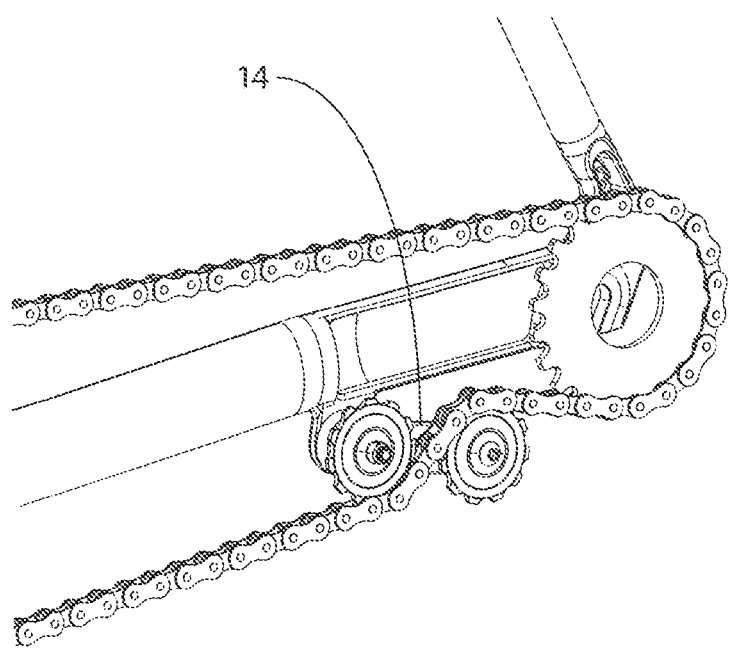
Fig. 15

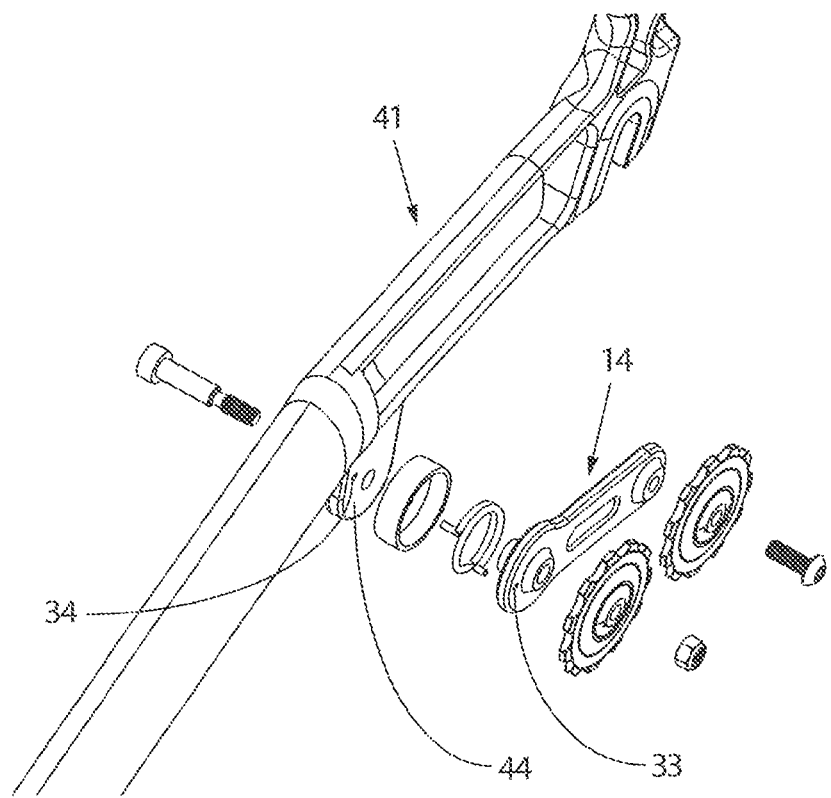
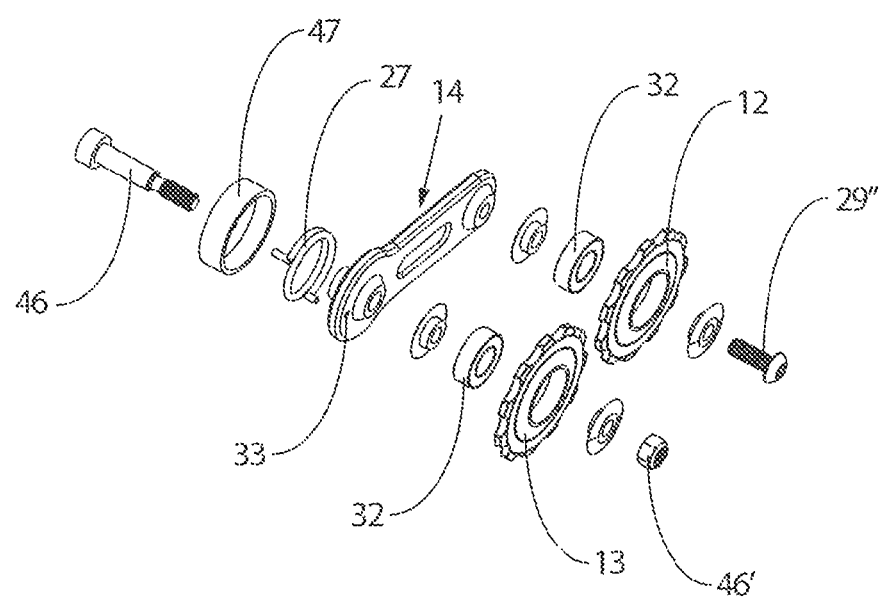
Fig. 16

CHAIN CASING AND CHAIN TENSIONING ASSEMBLY

CROSS-REFERENCE TO RELATED APPLICATIONS

This application is the United States national phase of International Application No. PCT/NL2018/050258 filed Apr. 23, 2018, and claims priority to Dutch Patent Application No. 2018764 filed Apr. 21, 2017, the disclosures of which are hereby incorporated by reference in their entirety.

BACKGROUND OF THE INVENTION

Field of the Invention

The present invention relates to a chain casing for encasing of a chain spanning a main chain sprocket and a driven chain sprocket, such as comprising two free chain parts, a pulling chain part and a returning chain part, of preferably a vehicle, such as a bicycle. Furthermore, the present invention relates to such a chain casing comprising a chain tensioner. Furthermore, the present invention relates to a chain tensioner assembly for providing a tensioning action to a chain part, such as a pulling chain part or a returning chain part.

Description of Related Art

It is known to provide a chain casing to a bicycle, in which the chain casing protects the clothing of the riding person. Furthermore, it is known here with that such a chain casing provides sufficient space to allow movement of the chain therein, which requires a relatively spacious chain casing as the chain varies in length over time and recurrent adjusting of the chain is undesirable. To this end, according to the prior art a solution is provided in the form of a very tight casing that is resting on the chain during use and as such is causing wear and noise. The present inventor, also according to the prior art, has provided a tight casing that is supported at the crank axle of the bicycle by a support such that it is constantly arranged above the chain and thus does not make contact during use.

SUMMARY OF THE INVENTION

In order to improve such prior art, the present invention provides a chain casing for encasing of a chain spanning a main chain sprocket and a driven chain sprocket, such as comprising two free chain parts, a pulling chain part and a returning chain part, of preferably a vehicle, such as a bicycle comprising a frame, the chain casing comprising:
  a main chain sprocket cover element for covering of the chain at the main chain sprocket, such as a pedal spindle chain sprocket;
  a pulling chain part cover element for covering of at least a part of a pulling chain part between a main chain sprocket and the driven chain sprocket;
  a returning chain part cover element for covering of at least a returning chain part between the main chain sprocket and the driven chain sprocket;
  a chain tensioner cover element for covering of a chain tensioner assembly with the chain arranged therethrough.

It is an advantage of such a chain casing according to the present invention that it is usable in combination with a chain tensioner assembly and a wheel hub transmission while the chain is arranged in the chain casing, as opposed to the known use of a chain tensioner in combination with a derailleur gear in combination with which such a chain casing is not usable because of the travel of movement of the chain in vertical direction. As such, as first preferred effect, it is provided that the very tight chain casing is also usable during extension of the chain length during use without undesired chain contact. Thus, for example cushioning blocks for making contact between the chain and the previous chain casing of the present inventor is not required. Noise by contact between the chain and the chain casing is thus furthermore diminished or substantially prevented. A goal of the present invention that is achieved by means of the present invention is that a bicycle is provided with a chain for which from delivery no maintenance is required within a broad range of wear of the chain.

According to a first preferred embodiment according to the present invention, the chain cover comprises the chain tensioner assembly for providing tensioning to a part, such as the pulling chain part or the returning chain part, the chain tensioner assembly comprising:
  a frame tube fastening element for fastening of the chain tensioner assembly to a frame tube, preferably a bottom stay,
  a tensioning arm for providing a tensioning relative to the chain in which the tensioning arm is movably arranged relative to the frame tube fastening element,
  tensioning means for providing a bias to the tensioning arm,
  a first guide sprocket, and preferably a second guide sprocket, for guiding of the chain, in which
  at least one guide sprocket is arranged at the tensioning arm in order to provide a tensioning action relative to the chain, and in which
  the first guide sprocket and the preferred second guide sprocket are functional for guiding under bias during use, of one of the chain parts as tensioned part, preferably the returning chain part, such that the tensioned part is longer than the other part.

Such a preferred embodiment provides as advantage that the chain cover assembly is usable in combination with a chain casing according to the present invention. The chain is preferably substantially encased in the chain tensioner assembly by the chain tensioner cover element. The sides of the sprockets are preferably substantially covered by the same tensioner cover element.

By means of for example a pass through opening for a guide sprocket, it is achieved that the advantageous arrangement of the chain in the chain casing is combinable with the movability of at least one guide sprocket.

According to a further preferred embodiment, the chain casing, preferably the tensioning assembly thereof, comprises the first and second guide sprocket, wherein preferably a first of the first and second guide sprockets is arranged at a first side of the chain during use and a second of the first and second guide sprockets is arranged at a second side of the chain during use. There with, it is advantageously achieved that the path along which the chain extends between the tensioning assembly and the front chain sprocket is substantially embodied in a fixed manner while the path between the chain tensioning assembly and the rear sprocket is somewhat variable by having the path of the chain both in a condition in which it is mounted as in a somewhat stretched condition after energy consumption thereof. It is likewise provided that the path between the tensioning assembly and the front sprocket is variable and the path between the chain tensioning assembly and the rear sprocket is fixed or that both of are variable, however a fixed path between the front sprocket and the tensioning assembly is presently considered as the most preferred embodiment.

According to a further preferred embodiment, the chain casing comprises a front side support for supporting of the chain cover at the front side thereof at the main chain sprocket of the bicycle, preferably for supporting of the chain casing at a crank tube of the bicycle. There with, advantageously and effectively, a distance between the chain and the drive sprocket of the bicycle is realized relative to the chain casing.

Further preferably, the chain casing comprises a rear sprocket cover element. There with, a protection of the chain at that location is realized. Further preferably the rear sprocket cover element provides a broader pass through space than the pass through space in the pulling chain part cover element or the returning chain part cover element for the purpose of allowing processing of the chain in several tensioning positions of the chain tensioner assembly. There with, a higher space at the location of the chain tensioner assembly is provided than at the location of the rear sprocket. Such a height variable pass through space provides an advantageous space for play for the chain between the chain tensioning assembly and the rear sprocket, or alternatively the front sprocket.

According to a further preferred embodiment, the chain casing comprises coupling means for coupling of the corporate elements with the chain tensioner assembly, preferably the return chain part cover element, the rear sprocket cover element and or the chain tensioner cover element. There with, mounting at the bicycle is achievable advantageously. Furthermore, such coupling means preferably provide a certain degree of adjustability of the length of the chain cover.

Further preferably, the tensioning arm is rotatably arranged relative to the frame and/or frame tube fastening element around a rotation heart line of the first and or the second guide sprocket. Further preferably, the tensioning arm is rotatably arranged relative to the frame and/or frame tube fastening element around a rotation arm and between the first and second guide sprocket. There with, the tensioning arm advantageously functions as a lever or a cantilever with which a bias is applied to the chain. It is also realized that the tensioned part of the chain, preferably the returning chain part of the chain, is longer than the other chain part, preferably the pulling chain part of the chain.

According to a further preferred embodiment, the chain casing comprises a biasing member, such as a spring, such as a torsion spring. With such a biasing member, the bias is advantageously provided for the purpose of tensioning of the chain.

Further preferably, the chain tensioner cover element is arranged at the returning chain part. During driving of the bicycle, the returning chain part is subjected to a relatively low pulling force because the pedaling force pulls at the rear sprocket from the front sprocket with the pulling chain part. The tensioning of the chain by means of the same tensioner assembly is thus preferably applied at the return chain part of the chain.

According to a further preferred embodiment, the chain casing comprises a mounting bracket. An advantage of such a mounting bracket is that the chain casing and/or the chain tensioner assembly is advantageously supportable in the following ways.

Preferably, the mounting bracket serves the purpose of adjustable or adaptable arrangement of the guide sprockets relative to the frame tube fastening element. With this, it is advantageously achieved that the guide sprockets are alignable with the chain. Further preferably, the mounting bracket serves the purpose of supporting the chain casing or a cover element thereof, such as the chain tensioner cover element.

Further preferably, the mounting bracket comprises support means for supporting of the chain casing or a cover element thereof, such as the rear chain sprocket cover element. As such, this mounting bracket comprises advantageously a support for the purpose of supporting the rear side of the chain casing where the front support sup-ports the front side of the chain casing.

Further preferably, the chain tensioner assembly comprises support means for supporting the chain casing or a cover element thereof, such as the returning chain part cover element.

According to a further preferred embodiment, the tensioning arm is mountable to a fastening member, such as a fastening eye, by means of the frame tube fastening element, arranged at the frame, preferably a bottom stay thereof. With this, advantageously, a direct mounting of the tensioning arm to the frame is achieved.

Further preferably, the chain casing or a cover element thereof is mountable to a fastening member arranged at the frame, preferably a bottom stay thereof. There with, a separate fastening is realized of the chain casing relative to the fastening of the tensioning arm or the chain tensioning assembly.

The fastening member is thereby further preferably attached to the frame, such as the bottom stay thereof, by means of a screw connection, further preferably by means of a hidden screw connection by means of a recess in the bottom stay, preferably arranged in the inside of the bottom stay. An advantage thereof is that an easily fastenable mounting is realized of the chain casing, the tensioning arm and or the chain tensioner assembly. In case of the said fastening in a recess of the bottom stay, this fastening is both easily fastenable as invisible from the chain casing side of the bicycle. Furthermore, this fastening is concealed from the other side of the bicycle behind the wheel.

According to a further preferred embodiment, the fastening member, such as the fastening eye, is mounted to the frame, such as the bottom stay thereof, by means of a welding connection. With this, it is advantageously realized that the firmness of the connection is realized and determined at manufacturing of the bottom stay or an end part thereof. Because of this, later mounting is relatively easy and the firmness is achieved under controllable circumstances relative to manufacturing of the bottom stay or the part there of.

According to a further preferred embodiment, the tensioning arm extends from a fastening point and/or rotation point thereof relative to the frame rearwardly towards a rear axle of the bicycle. Because of this, it is advantageously achieved that the chain pulls at the arm in the direction of motion thereof instead of pushes. A reverse mounting, in which the chain pushes in the extension direction of the tensioning arm is however also considered as variant.

According to a further preferred embodiment, a pass through opening for a guide sprocket is comprised in the chain casing. An advantage of such a pass through opening is that the chain casing allows for a relatively large range of movement of the tensioning arm and there with for the chain around the guiding sprockets. There with, a compact build of the chain tensioner cover element is realized. Furthermore, a large degree of stretch of the chain by wear is allowable without further maintenance.

A further aspect according to the present invention relates to a chain tensioning assembly for providing a tensioning action to a chain part, such as the pulling chain part or the returning chain part, the chain tensioning assembly comprising:
- a frame tube fastening element for fastening of the chain tensioning assembly to a frame tube, preferably a bottom stay,
- a tensioning arm for providing a tensioning relative to the chain in which the tensioning arm is movably arranged relative to the frame tube fastening element,
- tensioning means for providing a bias to the tensioning arm,
- a first guide sprocket, and preferably a second guide sprocket, for guiding of the chain, in which
- at least one guide sprocket is arranged at the tensioning arm in order to provide a tensioning action relative to the chain, and in which
- the first guide sprocket and the second guide sprocket are functional for guiding under bias during use, of one of the chain parts as tensioned part, preferably the returning chain part, such that the tensioned part is longer than the other part,
- the frame tube fastening element for fastening of the chain tensioner assembly to the frame tube functioning in coaction with a fastening provision of the frame tube, such as the bottom stay.

Such a chain tensioner assembly according to the present invention provides, especially in combination with the chain casing according to the present invention, the advantages and achieved goals according to the invention as described relative to the above aspect.

Further preferably, this chain tensioner assembly comprises features as described in this description according to the present invention and preferred embodiments.

BRIEF DESCRIPTION OF THE DRAWINGS

Further advantages, features and details of the present invention will be further elucidated on the basis of a description of one or more embodiments with reference to the accompanying figures.

FIG. 15 relates to a representation in perspective of a further preferred embodiment according to the present invention arranged at a bottom stay of a bicycle.

FIG. 16 relates to two exploded representations in perspective of the preferred embodiment according to FIG. 15.

DESCRIPTION OF THE INVENTION

Figure 1:
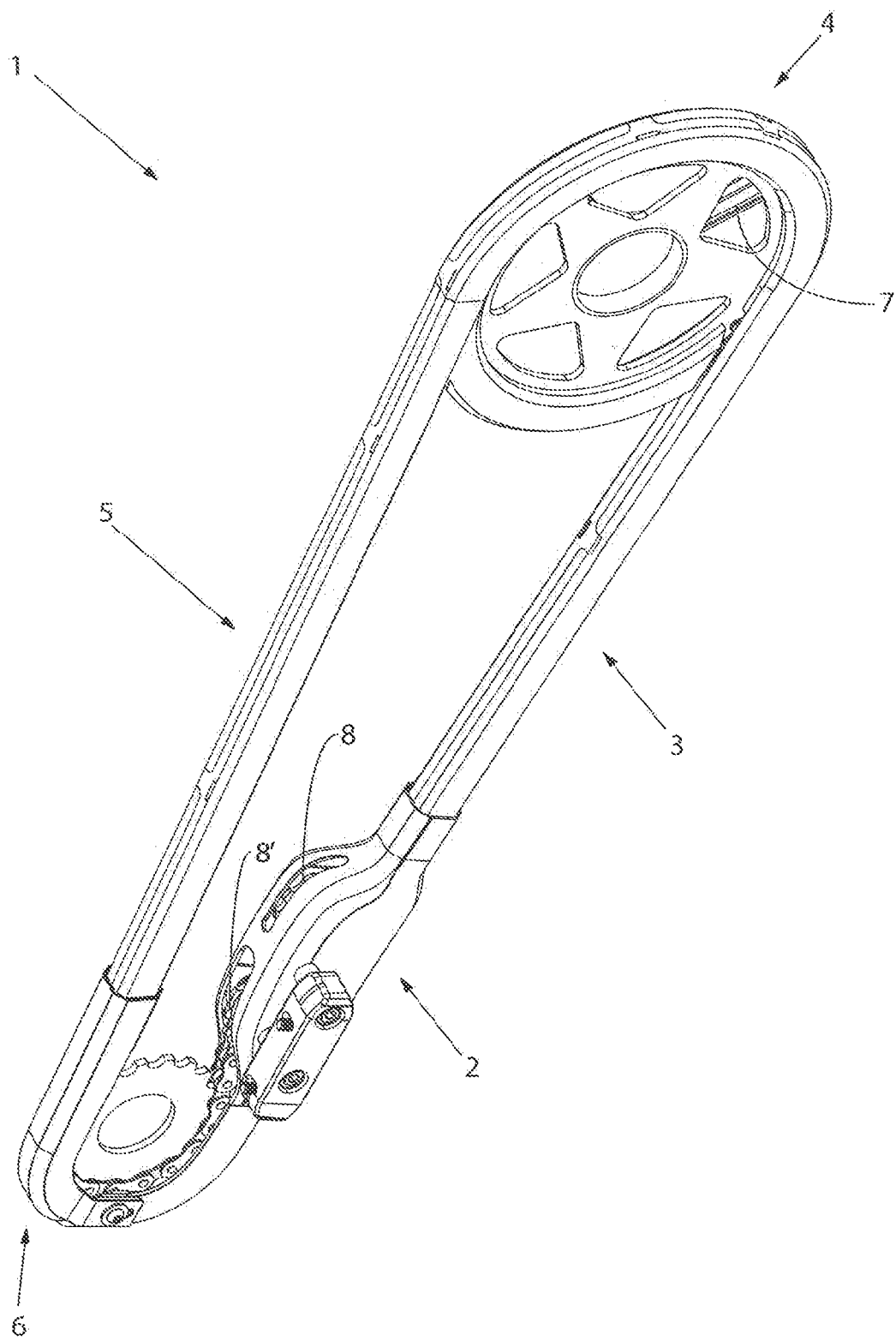
FIG. 1 relates to a perspective representation of a first preferred embodiment according to the present invention.
Figures 2, 3:
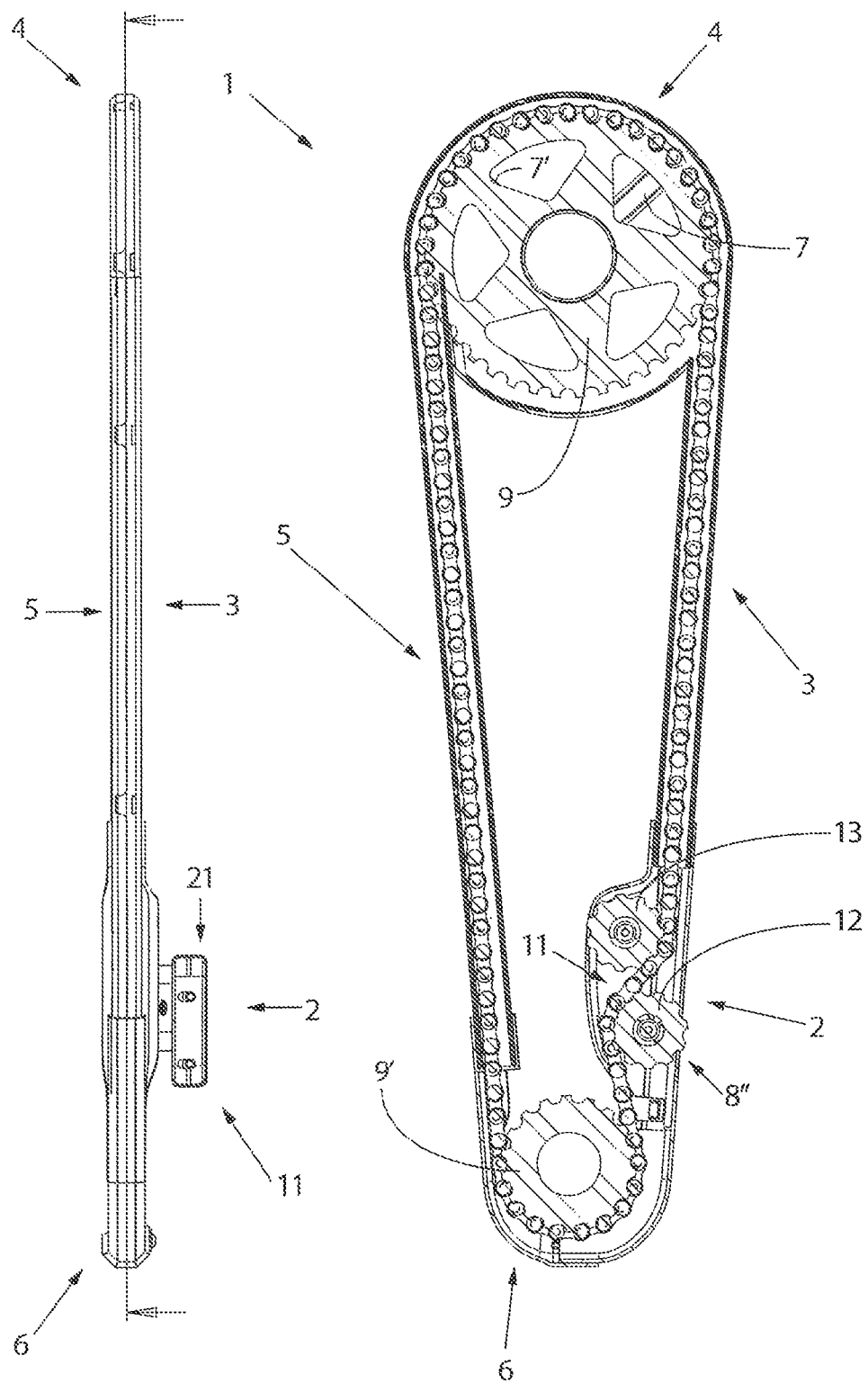
FIG. 2 relates to a schematic side view of the preferred embodiment according to FIG. 1.
FIG. 3 relates to a top view of the preferred embodiment according to FIG. 1 in assembled state.

A first preferred embodiment (FIG. 1) according to the present invention relates to a chain casing 1. This chain casing comprises a cover element 5 covering at least a part of a pulling part of the chain between the main sprocket and the driven sprocket. Furthermore, it comprises a cover element 4 for the main sprocket covering the chain at the location of the main sprocket. A further cover element 3 covers the chain or a part thereof returning from the main sprocket to the rear sprocket. Around the rear sprocket, there is the cover element 6 covering the chain at the location of the rear sprocket.

The cover element 2 serves to cover the chain at the location of a chain tensioner assembly 11. The chain tensioner assembly has two guide sprockets, the guide sprocket 13 and the tensioning sprocket 12. The guide sprocket 13 mainly serves the purpose of positioning the returning chain part relative to the chain tensioner assembly 11 and the drive sprocket 9. Because of this, it is realized that the chain can follow a straight path between the drive sprocket 9 and the guide sprocket 13. Because of this, it is possible to embody the returning chain part cover element very tight or very slim without the returning chain part making contact with the returning chain part cover element.

With this, an important goal of the present invention is achieved, viz. a very slim chain cover without chain contact and all disadvantages thereof.

In a similar manner, the rear sprocket 9' serves the purpose of positioning the pulling chain part relative to the drive sprocket 9. Because of this position, it is realized that the pulling chain part may be arranged within a very slim or very tight pulling chain part cover element 5.

For both the pulling chain part and the returning chain part it is of importance for the correct arrangement in the respective cover elements that the chain is tensionable.

This is realized by the action of the chain tensioner assembly 11. The chain tensioner assembly functions by keeping the tensioning sprocket 12 preferably upwardly directed under bias because of which the returning chain part of the chain, having the lowest tension, remains tensioned such that the same has a longer path relative to the pulling chain part and thus has a longer length. Alternatively, it is envisionable that the chain tensioner assembly is arranged at the pulling chain part.

As a slim design of the chain casing is preferred, the chain tensioner cover element has openings 8, 8', 8" for letting through parts of the guide sprockets.

Figure 4:
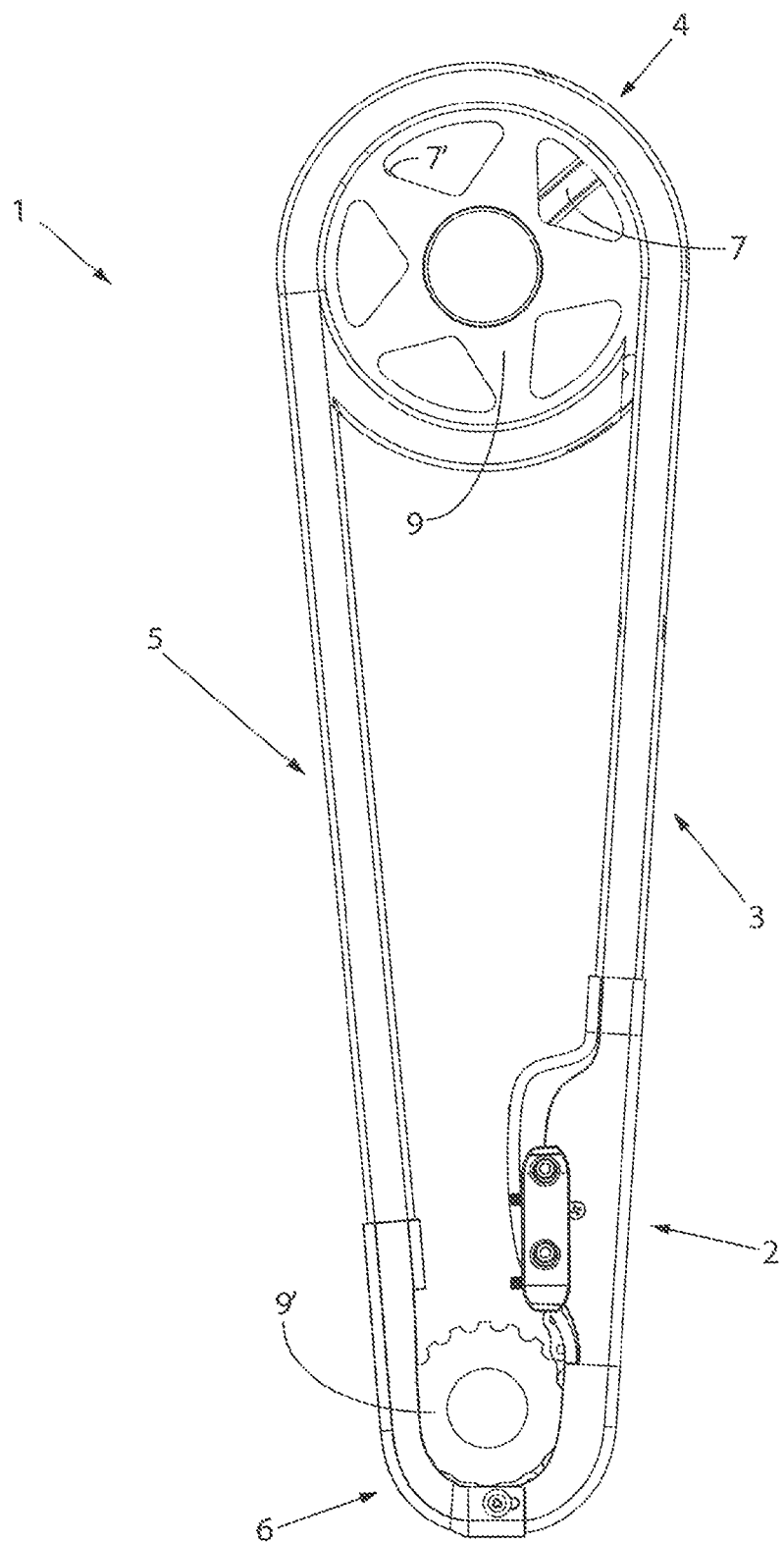
FIG. 4 relates to a side view of the preferred embodiment according to FIG. 1 in assembled state.
Figure 5:
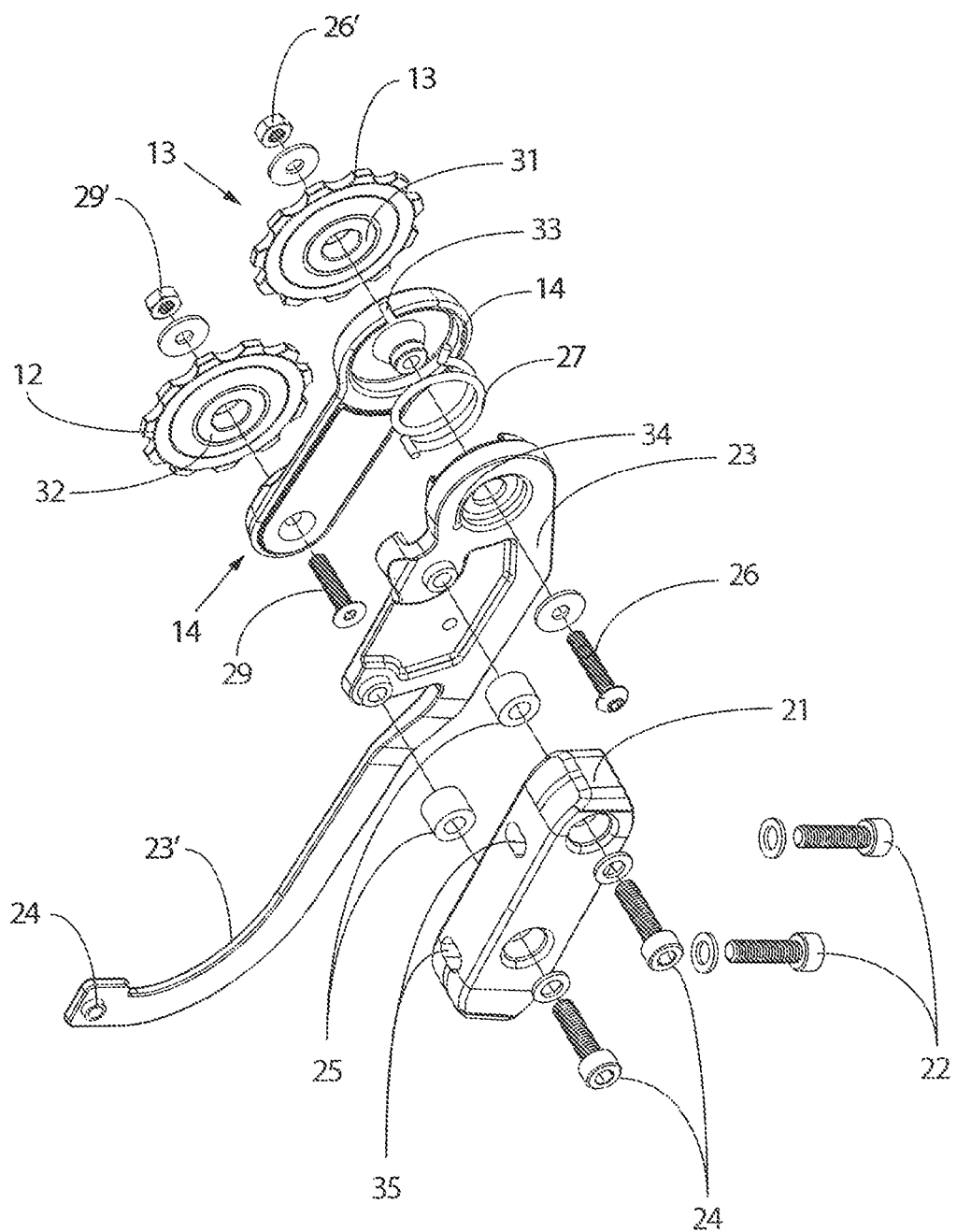
FIG. 5 relates to an exploded representation of a detail of the preferred embodiment according to FIG. 1.
Figure 6:
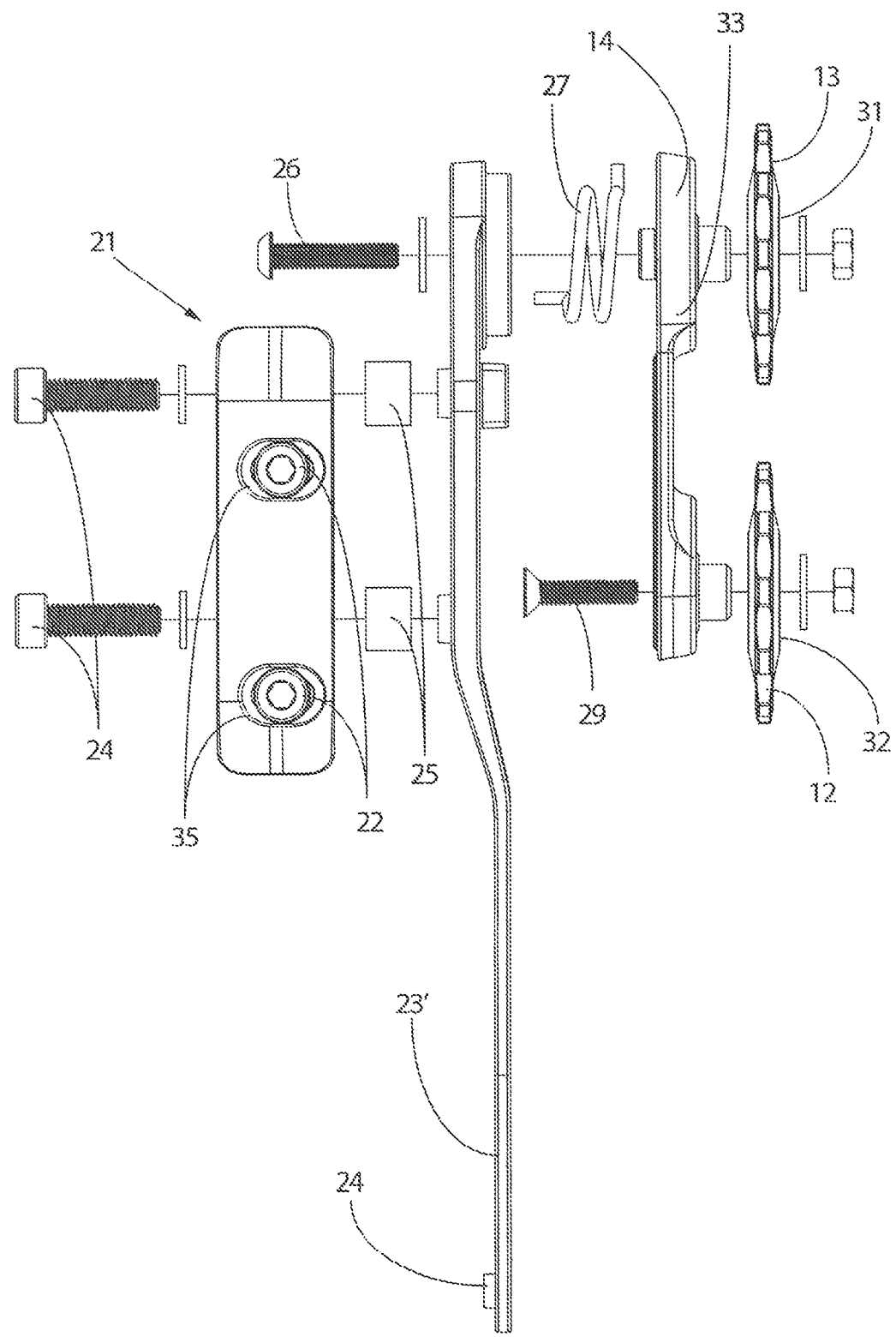
FIG. 6 relates to an exploded bottom view of the detail according to FIG. 5.
Figure 7:
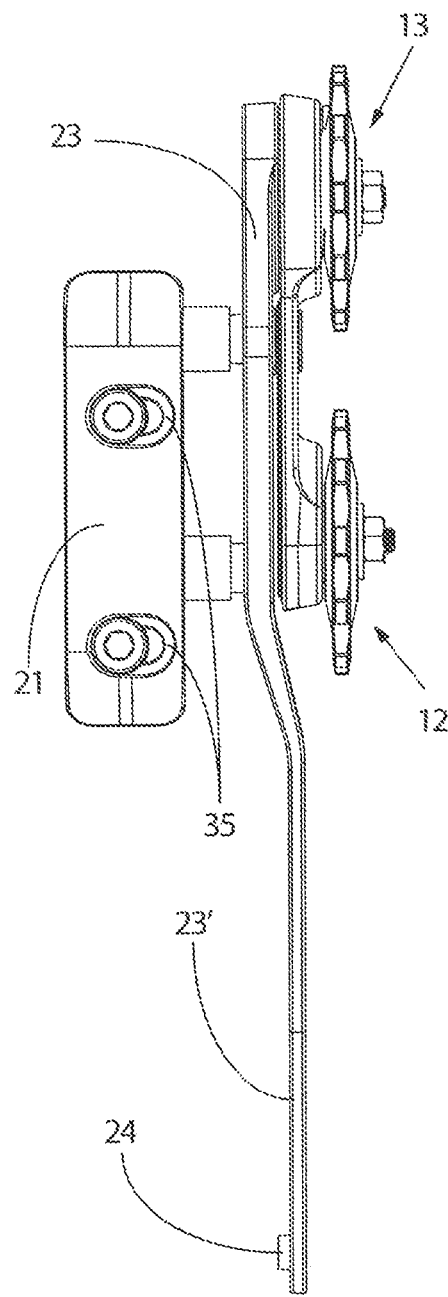
FIG. 7 relates to an exploded bottom view of the detail according to FIG. 5 in assembled state.
Figure 8:
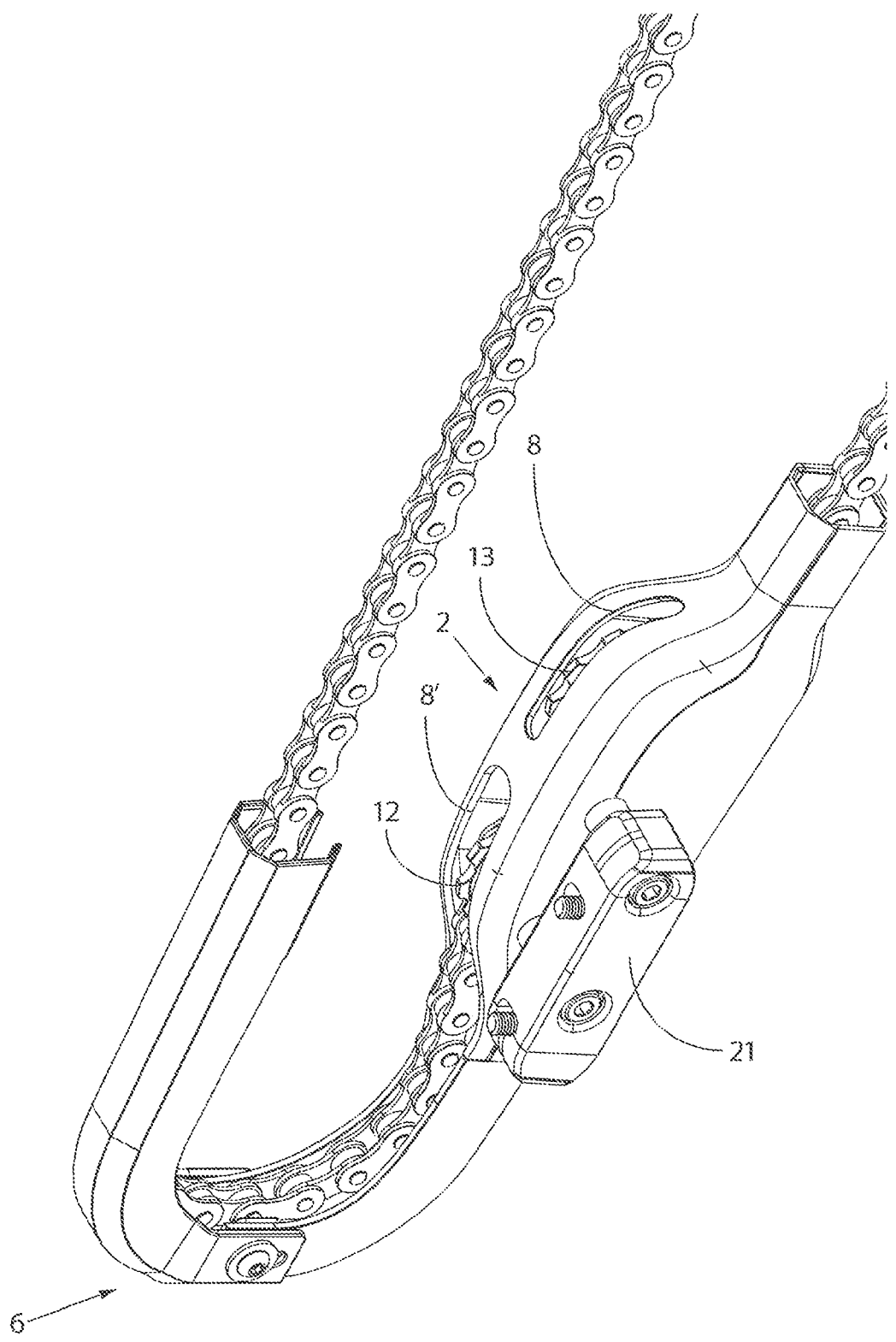
FIG. 8 relates to a detail of the preferred embodiment according to FIG. 1.

The chain casing is mounted relative to the crank axle by means of a support element 7, 7' (FIG. 4). With this, it is preferably achieved that the front side of the chain casing is fixed relative to crank axle or the crank tube of the frame. Because of this it is achieved that chain runs fully free relative to the inside of the main sprocket cover element 4.

At the rear side, the chain casing is fixed relative to the chain tensioner assembly by means of a support arm 23' or with a positioning hole 24 of mounting bracket 23, which chain tensioner assembly is itself fixed relative to the frame, especially relative to the bottom stay.

To this end, the chain tensioner assembly has a mounting block 21 that is mounted to preferably the bottom stay 41 with a recess or hollow space 42 (FIG. 13) of the bicycle by means of two bolts 22. For the purpose of aligning of the guide sprockets 12, 13 and the chain, the orientation of the mounting block relative to the bottom stay is adjustable by means of the elongated shape of the openings 35. The mounting bracket 23 is fastened to the mounting block 21 by means of two bolts 24. Hereby, two spacers, such as spacer rings 25 are used for achieving the correct alignment between the chain and the guide sprockets. The tensioning arm 14 is rotatably fastened to the mounting brackets 23 by means of a bolt 26. Between the mounting bracket 23 and the tensioning arm 14, a torsion spring 27 is arranged for keeping the tensioning arm under bias and with that the tensioning sprocket. For the purpose of the torsion action of the torsion spring, a fixation hole 34 is provided in the brackets 23 and a fixation slot 33 is provided in the tensioning arm.

The tension sprocket 12 is mounted to the free end of the tensioning arm 14 as guide sprocket by means of a bolt 29 and a nut 29'. The guide sprocket 13 is also mounted by means of the balls 26 with a nut 26' relative to the non-free end of the tensioning arm and the mounting brackets.

The guide sprockets are preferably mounted with ball bearings 31, 32. One sided mounting of the guide sprockets provides as further advantage that the mounting and placement of the chain is relatively simple. Alternatively, it is provided that the guide sprockets are arranged between a doubly embodied tensioning arm for providing of a respective stability.

FIGS. 9-14, alternative arrangements of the said parts are shown.

Figure 9:
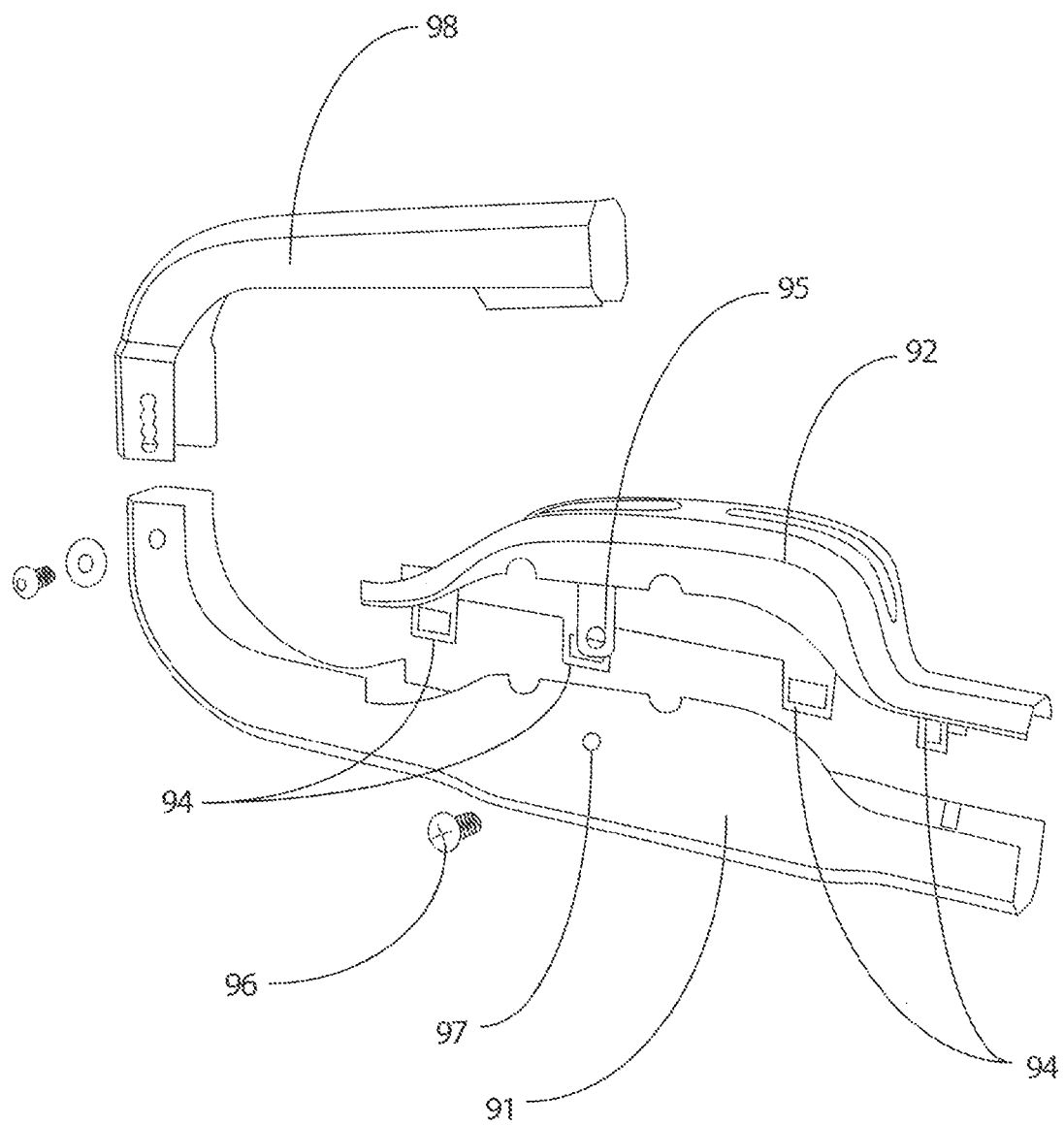
FIG. 9 relates to a detail of a further preferred embodiment.
Figure 10:
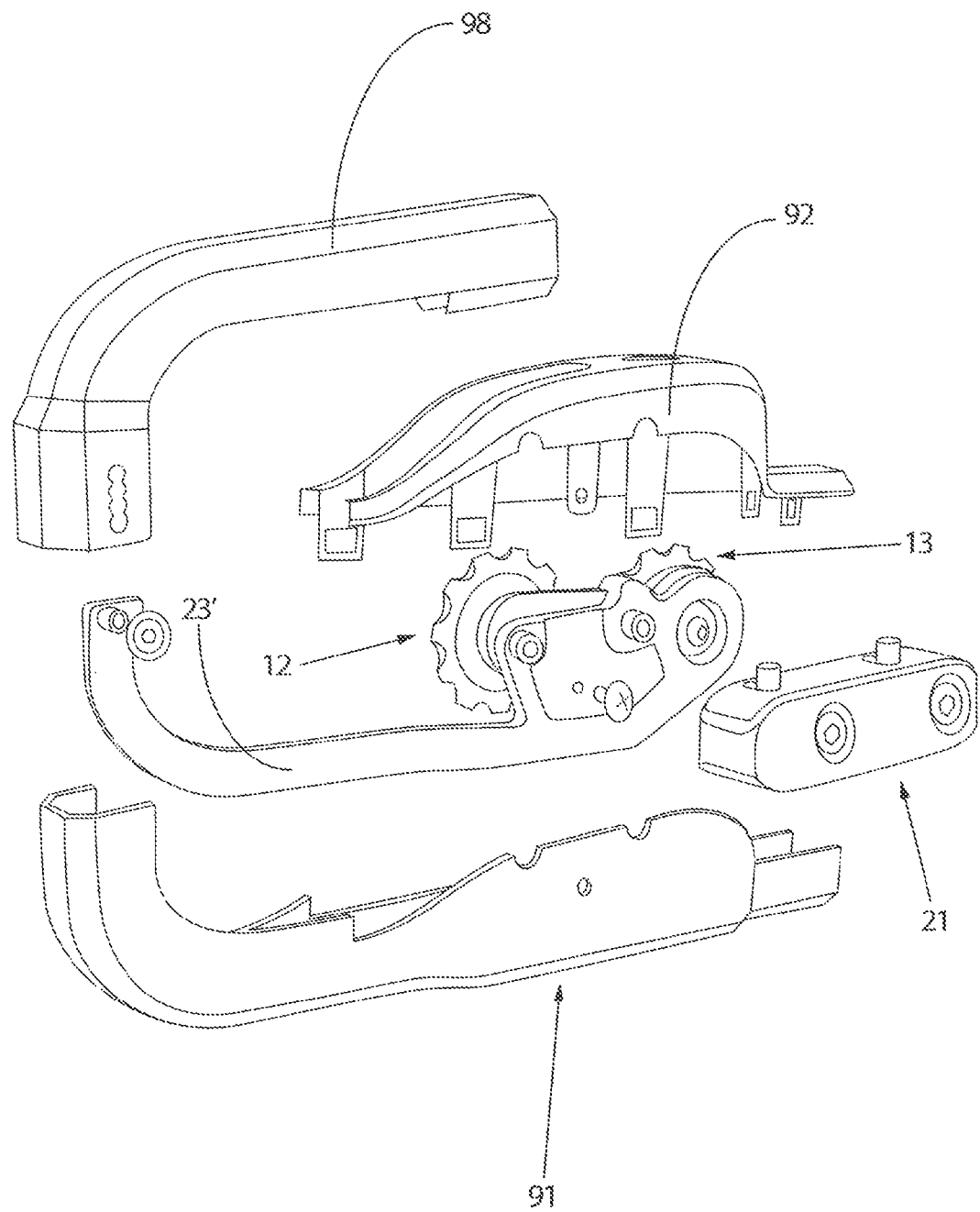
FIG. 10 relates to a representation of a preferred embodiment according to FIG. 9 in a different perspective with a further preferred embodiment of a chain tensioner assembly.

The preferred embodiment according to FIGS. 9 and 10 provides an alternative way of constructing the chain tensioner cover element and the rear sprocket cover element. These are partly joined together with a shell part 91 forming the bottom part of the chain tensioner cover element and a part of the rear sprocket cover element. A further shell part 92 forms the top side of the chain tensioner cover element. These are both assembled by means of click connecting elements 94 as arranged at the further shell part 92 for cooperation with respective receiving ridges (not shown) of the shell part 91. Furthermore, a screw eye 95 is provided fastenable with the screw 96 through opening 97. The upper side of the rear sprocket cover element is formed by curved element 98.

Figure 11:
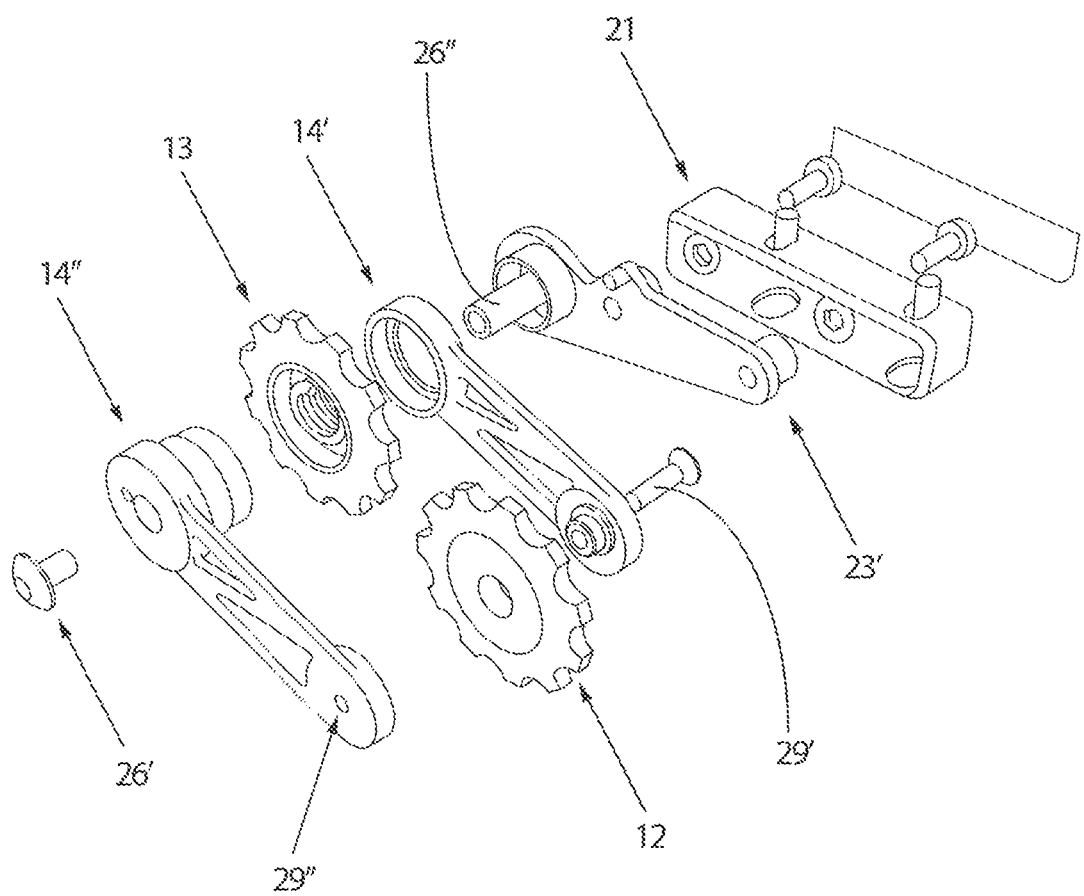
FIG. 11 relates to a representation in perspective of a further preferred embodiment of a chain tensioning assembly according to the present invention.
Figure 12:
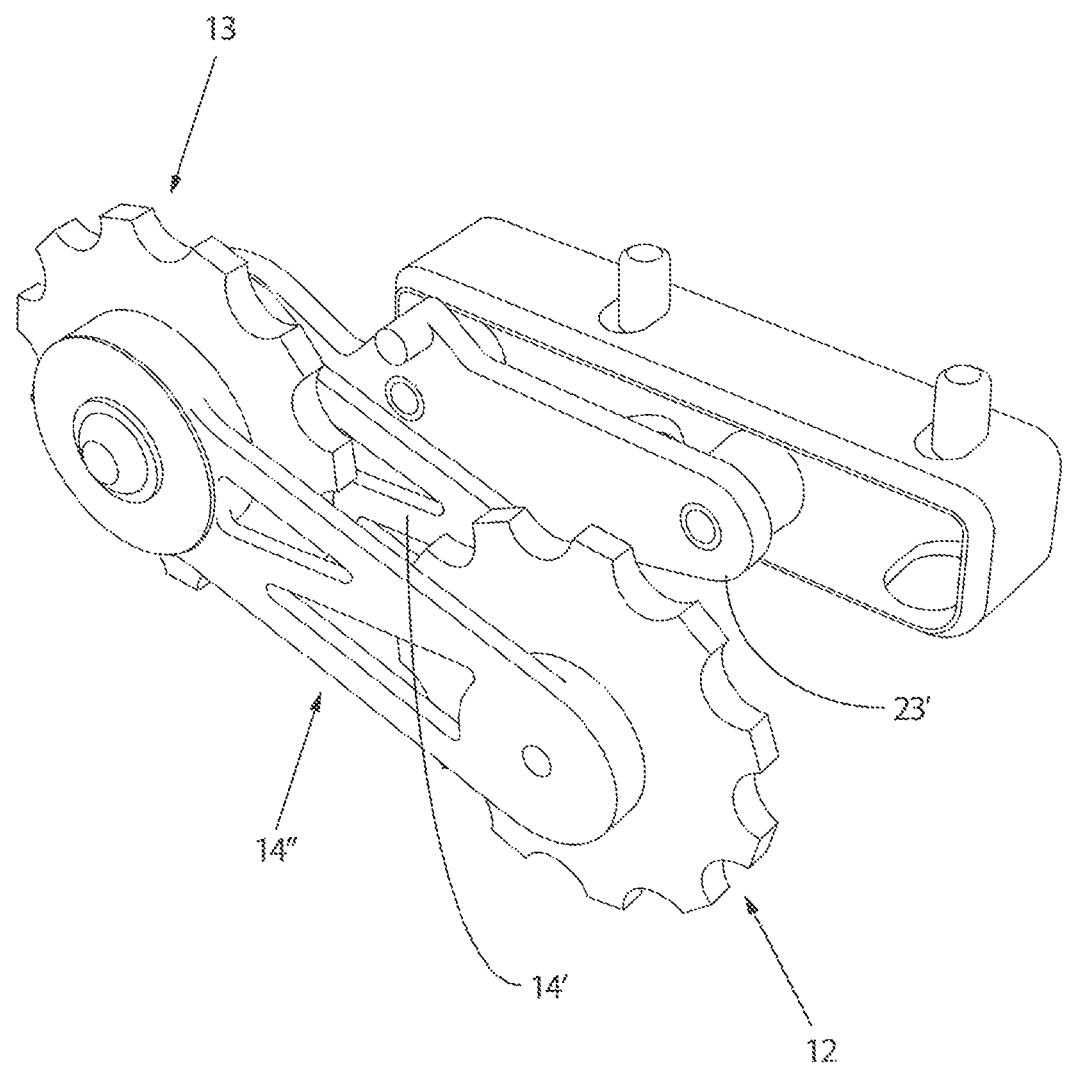
FIG. 12 relates to a representation in perspective of the preferred embodiment according to FIG. 11.
Figure 13:
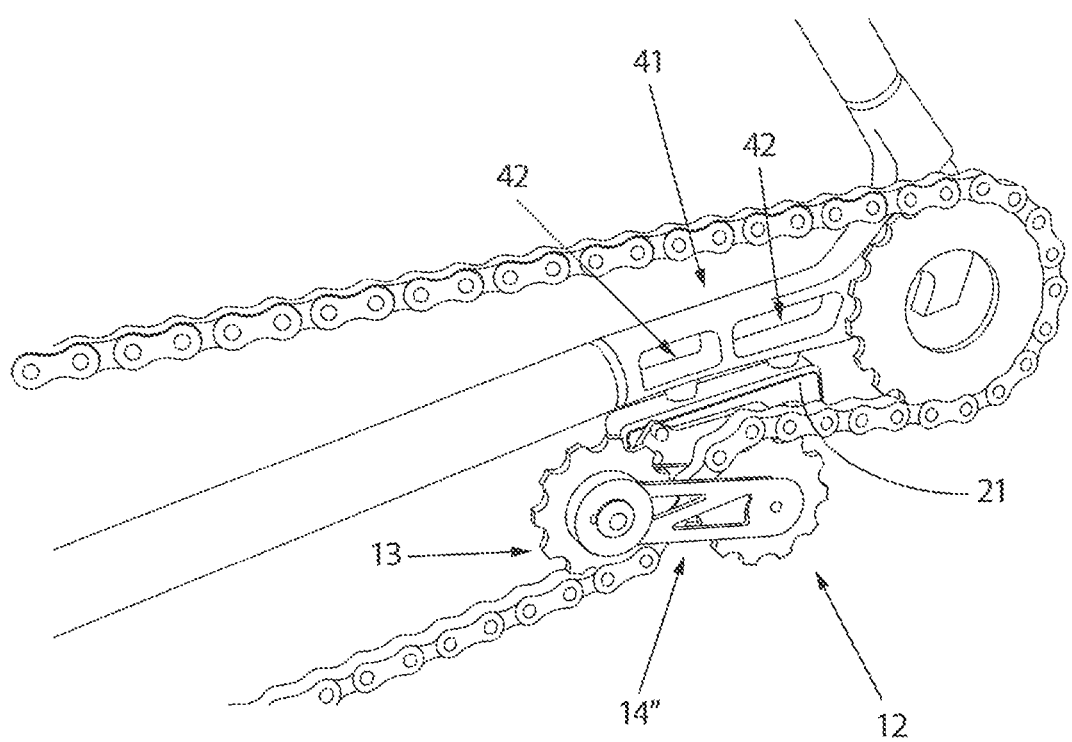
FIG. 13 relates to a further representation in perspective of the preferred embodiment according to FIG. 11 assembled to a bottom stay of a bicycle.
Figure 14:
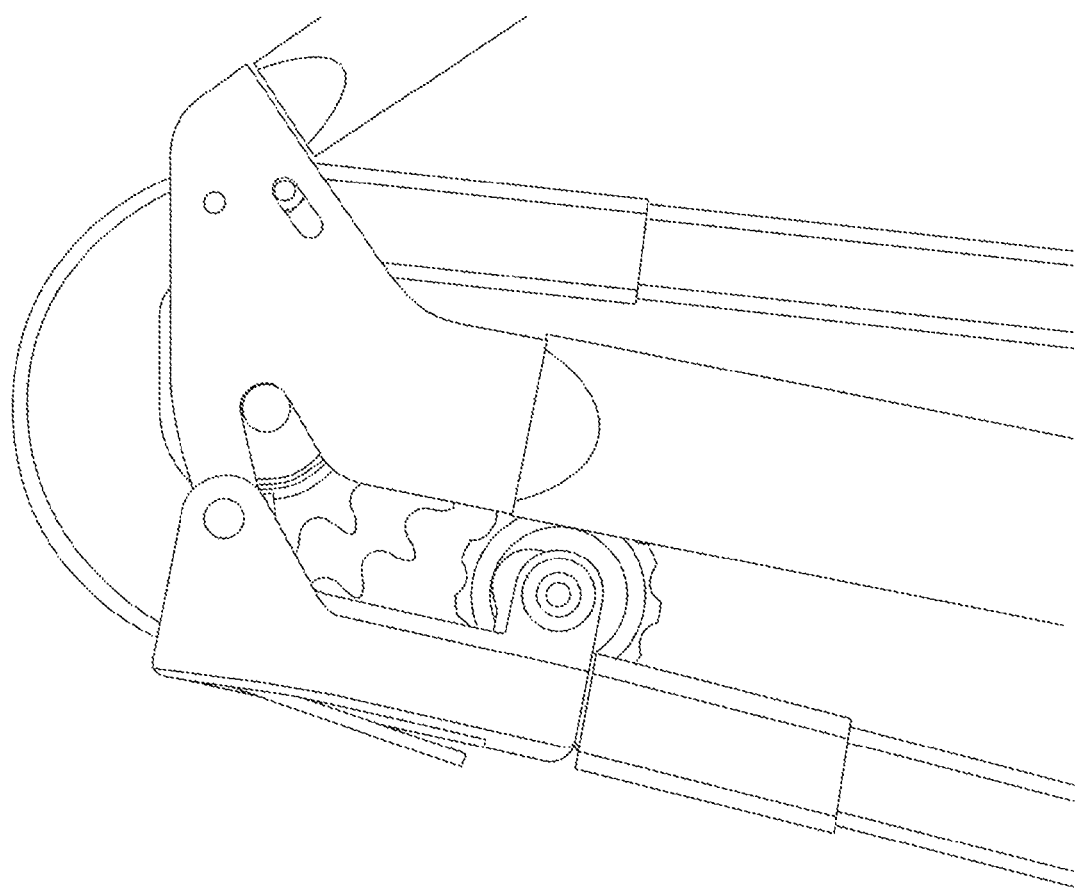
FIG. 14 relates to a representation of a further preferred embodiment.

The preferred embodiment according to FIGS. 11-13 relates to the said variant with the doubly embodied tensioning arm. Herewith, the guide sprocket 13 and the tensioning sprocket 12 are arranged between the doubly embodied tensioning arm. The tensioning arm is hereby built up from one side 14' and a side 14". Such arrangement provides as is described an advantageous structural firmness to the assembly in part comprising the tensioning arm with the guide sprockets when assembled. Hereby, at the side of the tensioning sprocket, both arms are interconnected by means of a screw 29' that is screwed in an inner thread end part 29" of side 14" of the tensioning arm. A fastening at the side of the guide sprocket 13 is realized by means of a screw 26' for screwing thereof in a nut 26" that is also provided with an inner thread. This nut 26" is part of the mounting elements of mounting brackets 23' that functions as an interconnection between the tensioning arm and the mounting block 21.

The preferred embodiment according to FIGS. 15 and 16 relates to a variant in which the tensioning arm is directly fastened to a support 44 by means of the frame tube fastening element, which support 44 is itself directly fastened to the bottom stay 41', in the shown variant by means of welding, alternatively by means of a screw connection. With this, the frame tube fastening element substantially relates to the screw connection embodied by means of the screw 46 and the nut 46' with which the tensioning arm 14 is fastenable to the support 44.

Furthermore, a housing 47 is provided for the torsion spring 27 for keeping the tensioning arm 14 under bias. This housing also serves as a spacer for providing a correct alignment between the guide sprockets and the chain. The guide sprocket 13 is also attached to the tensioning arm 14 by means of the screw connection comprising the screw 46 and the nuts 46'. The tensioning sprocket 12 is connected with the tensioning arm by a screw connection with the screw 29". Both guide sprockets are provided with a bearing 32 to provide a bearing function relative to the tensioning arm and the connection therewith.

Although the description of this document is aimed at the chain tensioning assembly being arranged in the return chain part, it is also intended that this can be arranged in the pulling chain part and that such an embodiment falls under the scope of the attached claims. A chain part hereby relates either to the pulling chain part or the returning chain part. The pulling chain part extends from the driving sprocket to the driven sprocket and the returning chain part extends from the driven sprocket to the driving sprocket. Practically, the pulling chain part is under most tension.

A chain tensioning assembly for providing a tensioning action to a chain part, such as the pulling chain part or the returning chain part, the chain tensioning assembly comprising:

a frame tube fastening element for fastening of the chain tensioning assembly to a frame tube, preferably a bottom stay, a tensioning arm for providing a tensioning relative to the chain in which the tensioning arm is movably arranged relative to the frame tube fastening element, tensioning means for providing a bias to the tensioning arm, a first guide sprocket, and preferably a second guide sprocket, for guiding of the chain, in which at least one guide sprocket is arranged at the tensioning arm in order to provide a tensioning action relative to the chain, and in which the first guide sprocket and the second guide sprocket are functional for guiding under bias during use, of one of the chain parts as tensioned part, preferably the returning chain part, such that the tensioned part is longer than the other part.

The present invention is described in the foregoing on the basis of several preferred embodiments. Different aspects of different embodiments can be combined, wherein all combinations which can be made by a skilled person on the basis of this document must be included. These preferred embodiments are not limitative for the scope of protection of this document. The rights sought are defined in the appended claims.

The invention claimed is:

1. A chain casing for encasing of a chain spanning a main chain sprocket and a driven chain sprocket, such as comprising two free chain parts, a pulling chain part and a returning chain part, of preferably a vehicle, such as a bicycle comprising a frame, the chain casing comprising:
- a main chain sprocket cover element for covering of the chain at the main chain sprocket, such as a pedal spindle chain sprocket:
- a pulling chain part cover element for enclosing of at least a part of a pulling chain part between a main chain sprocket and the driven chain sprocket;
- a returning chain part cover element, positioned at a distance from said pulling chain part cover element, for enclosing of at least a returning chain part between the main chain sprocket and the driven chain sprocket; and
- a chain tensioner cover element for covering of a chain tensioner assembly with the chain arranged therethrough.

2. The chain casing according to claim 1 comprising the chain tensioner assembly for providing tensioning to a part, such as the pulling chain part or the returning chain part, the chain tensioner assembly comprising:
- a frame tube fastening element for fastening of the chain tensioner assembly to a frame tube,
- a tensioning arm for providing a tensioning relative to the chain in which the tensioning arm is movably arranged relative to the frame tube fastening element,
- tensioning means for providing a bias to the tensioning arm,
- a first guide sprocket, for guiding of the chain, in which
- at least one guide sprocket is arranged at the tensioning arm in order to provide a tensioning action relative to the chain, and in which
- the first guide sprocket is functional for guiding under bias during use, of one of the chain parts as tensioned part, such that the tensioned part is longer than the other part.

3. The chain casing according to claim 1 comprising the first and a second guide sprocket, wherein a first of the first and second guide sprocket is arranged at a first side of the chain during use and a second of the first and second guide sprocket is arranged at a second side of the chain during use.

4. The chain casing according to claim 1, comprising a front side support for supporting of the chain cover at the front side thereof at the main chain sprocket of the bicycle.

5. The chain casing according to claim 1 comprising a rear sprocket cover element.

6. The chain casing according to claim 1 comprising coupling means for coupling of cover elements with the chain tensioner assembly.

7. The chain casing according to claim 1, in which the tensioning arm is rotatably arranged relative to the frame and or frame tube fastening element around a rotation heart line of the first and or the second guide sprocket.

8. The chain casing according to claim 1, in which the tensioning arm is rotatably arranged relative to the frame.

9. The chain casing according to claim 1 comprising a biasing member.

10. The chain casing according to claim 1, in which the chain tensioner cover element is arranged at the returning chain part.

11. The chain casing according to claim 1 comprising a mounting bracket.

12. The chain casing according to claim 11, wherein the mounting bracket serves the purpose of adjustable or adaptable arrangement of the guides progress relative to the frame tube fastening element.

13. The chain casing according to claim 11, wherein the mounting bracket serves the purpose of supporting the chain casing or a cover element thereof, such as the chain tensioner cover element.

14. The chain casing according to claim 11, wherein the mounting bracket comprises support means for supporting of the chain casing or a cover element thereof, such as the rear chain sprocket cover element.

15. The chain casing according to claim 1, wherein the chain tensioner assembly comprises support means for supporting the chain casing or a cover element thereof.

16. The chain casing according to claim 1, wherein the tensioning arm is mountable to a fastening member, such as a fastening eye, by means of the frame tube fastening element, arranged at the frame.

17. The chain casing according to claim 1, wherein the chain casing or a cover element thereof is mountable to a fastening member arranged at the frame.

18. The chain casing according to claim 16, wherein the fastening member is attached to the frame by means of a screw connection.

19. The chain casing according to claim 16, wherein the fastening member, such as the fastening eye, is mounted to the frame, such as the bottom stay thereof, by means of a welding connection.

20. The chain casing according to claim 1, in which the tensioning arm extends substantially in a backward direction towards a rear axle of the bicycle from a fastening point and or a rotation points thereof relative to the frame.

21. The chain casing according to claim 1 comprising at least one pass through opening for a guide sprocket.

22. A chain tensioning assembly for providing a tensioning action to a chain part, the chain tensioning assembly comprising:
- a frame tube fastening element for fastening of the chain tensioning assembly to a frame tube,
- a tensioning arm for providing a tensioning relative to the chain in which the tensioning arm is movably arranged relative to the frame tube fastening element,
- tensioning means for providing a bias to the tensioning arm,
- a first guide sprocket, and a second guide sprocket, for guiding of the chain, in which
- at least one guide sprocket is arranged at the tensioning arm in order to provide a tensioning action relative to the chain, and in which
- the first guide sprocket and the second guide sprocket are functional for guiding under bias during use, of one of the chain parts as tensioned part, such that the tensioned part is longer than the other part, and
- the frame tube fastening element for fastening of the chain tensioner assembly to the frame tube functioning in coaction with a fastening provision of the frame tube.

* * * * *